United States Patent
Cook et al.

(10) Patent No.: US 11,077,946 B2
(45) Date of Patent: Aug. 3, 2021

(54) AIRCRAFT INTERIOR LAVATORY

(71) Applicant: B/E Aerospace, Inc., Winston-Salem, NC (US)

(72) Inventors: Donald F. Cook, Arlington, WA (US); Liberty Harrington, Seattle, WA (US); Philipp Steiner, Seattle, WA (US); Robert K. Brauer, Seattle, WA (US); Trevor Skelly, Mercer Island, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/819,878

(22) Filed: Mar. 16, 2020

(65) Prior Publication Data

US 2020/0391868 A1    Dec. 17, 2020

Related U.S. Application Data

(63) Continuation of application No. 16/283,471, filed on Feb. 22, 2019, now Pat. No. 10,625,862, which is a
(Continued)

(51) Int. Cl.
*B64D 11/02* (2006.01)
*B64C 1/10* (2006.01)
(Continued)

(52) U.S. Cl.
CPC ............ *B64D 11/02* (2013.01); *B64C 1/10* (2013.01); *B64D 11/06* (2013.01); *B64D 11/064* (2014.12); *B64F 5/00* (2013.01); *Y02T 50/40* (2013.01)

(58) Field of Classification Search
CPC ............ B64D 11/00; B64D 2011/0046; B64D 11/0023; B64D 11/06; B64D 2011/0617;
(Continued)

(56) References Cited

U.S. PATENT DOCUMENTS 2,650,368 A    9/1953  Evans
2,760,443 A    8/1956  Gobrecht
(Continued)

FOREIGN PATENT DOCUMENTS

CN    1867485 A    11/2006
CN    101218149 A    7/2008
(Continued)

OTHER PUBLICATIONS

B/E Aerospace Investor Day Presentation dated Mar. 12, 2012. 56 pages.
(Continued)

*Primary Examiner* — Benjamin P Lee
(74) *Attorney, Agent, or Firm* — Foley & Lardner LLP

(57) ABSTRACT

A lavatory for an aircraft cabin includes a wall having a forward wall portion disposed immediately aft of and substantially conforming to an exterior aft surface of an aircraft cabin structure, such as a passenger seat, that is substantially not flat in a vertical plane. The forward wall portion includes a forward projection over an aft portion of the adjacent passenger seat. The forward wall portion can define a secondary space in the interior lavatory space, which can provide an amenity stowage space, and can include design elements providing visual space.

17 Claims, 1 Drawing Sheet

Related U.S. Application Data continuation of application No. 15/258,529, filed on Sep. 7, 2016, now Pat. No. 10,259,558, which is a continuation of application No. 15/141,494, filed on Apr. 28, 2016, now Pat. No. 9,463,878, which is a continuation of application No. 14/709,378, filed on May 11, 2015, now Pat. No. 9,365,292, which is a continuation of application No. 14/043,500, filed on Oct. 1, 2013, now Pat. No. 9,073,641, which is a continuation of application No. 13/089,063, filed on Apr. 18, 2011, now Pat. No. 8,590,838.

(60) Provisional application No. 61/326,198, filed on Apr. 20, 2010, provisional application No. 61/346,835, filed on May 20, 2010.

(51) Int. Cl.
*B64D 11/06* (2006.01)
*B64F 5/00* (2017.01)

(58) Field of Classification Search
CPC . B64D 2011/0665; B63B 11/00; B63B 11/02; B63B 29/00; B63B 29/02
See application file for complete search history.

(56) References Cited

U.S. PATENT DOCUMENTS

| | | |
|---|---|---|
| 2,914,001 A | 11/1959 | Murphy |
| 3,738,497 A | 6/1973 | Betts et al. |
| 4,055,317 A | 10/1977 | Greiss |
| 4,884,767 A | 12/1989 | Shibata |
| 5,150,863 A | 9/1992 | Hozumi |
| 5,333,416 A | 8/1994 | Harris et al. |
| 5,340,059 A | 8/1994 | Kanigowski |
| 5,482,230 A | 1/1996 | Bird et al. |
| 5,529,265 A | 6/1996 | Sakurai |
| 5,577,358 A | 11/1996 | Lutz |
| 5,611,503 A | 3/1997 | Brauer |
| 5,716,026 A | 2/1998 | Pascasio et al. |
| 6,000,659 A | 12/1999 | Brauer |
| 6,007,025 A | 12/1999 | Coughren et al. |
| 6,079,669 A | 6/2000 | Hanay et al. |
| 6,237,872 B1 | 5/2001 | Bar-Levav |
| 6,520,451 B1 | 2/2003 | Moore |
| 6,615,421 B2 | 9/2003 | Itakura |
| 6,742,840 B2 | 6/2004 | Bentley |
| 6,822,812 B1 | 11/2004 | Brauer |
| 6,874,731 B1 | 4/2005 | Brauer et al. |
| 6,889,936 B1 | 5/2005 | Pho et al. |
| D508,173 S | 8/2005 | Guard et al. |
| D516,496 S | 3/2006 | Guard et al. |
| D533,129 S | 12/2006 | Guard et al. |
| 7,156,345 B2 | 1/2007 | Brauer et al. |
| 7,222,820 B2 | 5/2007 | Wentland et al. |
| 7,252,267 B2 | 8/2007 | Young et al. |
| 7,284,287 B2 | 10/2007 | Cooper et al. |
| 7,331,545 B2 | 2/2008 | Young et al. |
| 7,448,574 B2 | 11/2008 | Young et al. |
| 7,448,575 B2 | 11/2008 | Cheung et al. |
| 7,469,860 B2 | 12/2008 | Young et al. |
| 7,516,919 B2 | 4/2009 | Young et al. |
| D606,923 S | 12/2009 | Young et al. |
| D617,254 S | 6/2010 | Guard et al. |
| 7,871,039 B2 | 1/2011 | Fullerton et al. |
| 7,934,679 B2 | 5/2011 | Bock et al. |
| 8,087,613 B2 | 1/2012 | Fullerton et al. |
| 8,096,502 B2 | 1/2012 | Bock et al. |
| 8,109,469 B2 | 2/2012 | Breuer et al. |
| 8,162,258 B2 | 4/2012 | Joannis et al. |
| 8,167,244 B2 | 5/2012 | Johnson et al. |
| 8,177,163 B2 | 5/2012 | Wilcynski et al. |
| 8,590,838 B2 | 11/2013 | Cook et al. |
| D705,909 S | 5/2014 | Koyama et al. |
| 8,991,947 B2 | 3/2015 | Lee |
| 9,321,534 B2 | 4/2016 | Grieve et al. |
| 9,327,836 B2 | 5/2016 | Weitzel et al. |
| 9,359,077 B2 | 6/2016 | Koyama |
| 9,382,006 B2 | 7/2016 | Koyama |
| 9,428,274 B2 | 8/2016 | Moje et al. |
| 9,457,903 B2 | 10/2016 | Moje et al. |
| 9,862,490 B2 | 1/2018 | Schliwa et al. |
| 9,862,491 B2 | 1/2018 | Mckee et al. |
| 9,908,623 B2 | 3/2018 | Hashberger et al. |
| 10,023,314 B2 | 7/2018 | Savian |
| 2003/0193220 A1 | 10/2003 | Jensen |
| 2005/0082430 A1 | 4/2005 | Young et al. |
| 2006/0065783 A1 | 3/2006 | Mills |
| 2006/0192050 A1 | 8/2006 | Cheung et al. |
| 2007/0164157 A1 | 7/2007 | Park |
| 2007/0170310 A1 | 7/2007 | Bock et al. |
| 2007/0241232 A1 | 10/2007 | Thompson |
| 2007/0295863 A1 | 12/2007 | Thompson |
| 2009/0050738 A1 | 2/2009 | Breuer et al. |
| 2009/0050783 A1 | 2/2009 | Roberts |
| 2009/0065642 A1 | 3/2009 | Cheung et al. |
| 2009/0146004 A1 | 6/2009 | Plant |
| 2009/0200422 A1 | 8/2009 | Johnson et al. |
| 2009/0255437 A1 | 10/2009 | Hachet et al. |
| 2010/0059625 A1 | 3/2010 | Saint-Jalmes et al. |
| 2010/0181425 A1 | 7/2010 | Guering et al. |
| 2011/0121134 A1 | 5/2011 | Schotte et al. |
| 2011/0139930 A1 | 6/2011 | Sutthoff et al. |
| 2011/0210205 A1 | 9/2011 | Bock et al. |
| 2011/0253835 A1 | 10/2011 | Cook et al. |
| 2012/0025018 A1 | 2/2012 | France et al. |
| 2012/0112505 A1 | 5/2012 | Breuer et al. |
| 2012/0253752 A1 | 10/2012 | Brauer |
| 2012/0273614 A1 | 11/2012 | Ehlers et al. |
| 2012/0325964 A1 | 12/2012 | Hawkins et al. |
| 2013/0206906 A1 | 8/2013 | Burrows et al. |
| 2013/0320139 A1 | 12/2013 | Cho |
| 2014/0014774 A1 | 1/2014 | Pozzi et al. |
| 2014/0027572 A1 | 1/2014 | Ehlers et al. |
| 2014/0027574 A1 | 1/2014 | Obadia et al. |
| 2014/0196206 A1 | 7/2014 | Savian et al. |
| 2015/0239563 A1 | 8/2015 | Cook et al. |
| 2015/0251760 A1 | 9/2015 | Hawkins et al. |
| 2015/0363656 A1 | 12/2015 | Brauer |

FOREIGN PATENT DOCUMENTS

| | | |
|---|---|---|
| CN | 101351384 A | 1/2009 |
| CN | 101588966 A | 11/2009 |
| CN | 101765541 A | 6/2010 |
| DE | 69422723 T2 | 6/2000 |
| DE | 69725542 T2 | 4/2004 |
| DE | 102007009863 A1 | 9/2008 |
| EP | 0 722 404 A1 | 4/1995 |
| EP | 0 850 834 A1 | 7/1998 |
| EP | 1 281 614 A1 | 2/2003 |
| EP | 1 685 023 A2 | 8/2006 |
| JP | H05-246355 A | 9/1993 |
| JP | 2007-523002 A | 8/2007 |
| JP | 2009-513419 A | 4/2009 |
| WO | WO-03/026495 A2 | 4/2003 |
| WO | WO-2005/014395 A1 | 2/2005 |
| WO | WO-2005/080196 A1 | 9/2005 |
| WO | WO-2007/006938 A1 | 1/2007 |
| WO | WO-2007/013164 A1 | 2/2007 |
| WO | WO-2009/073244 A1 | 6/2009 |
| WO | WO-2014/024046 A2 | 2/2014 |

OTHER PUBLICATIONS

B/E Aerospace News Release—"Boeing Delivers First of 100 Next-Generation 737s to Delta Air Lines Configured with Numerous B/E Aerospace Systems and Products."

B/E Aerospace Press Release regarding Investor Day Webcast dated Mar. 12, 2012.

B/E Aerospace, Inc.'s Opening Brief in case No. IPR2017-01275 and No. IPR2017-01276 dated Sep. 6, 2019. 218 pages.

(56) References Cited

OTHER PUBLICATIONS

B/E Aerospace, Inc's Reply Brief in case No. IPR2017-01275 & IPR2017-01276 dated Nov. 6, 2019. 22 pages.
B/E Aerospace, Inc.'s Motion for Preliminary Injunction, May 16, 2014, 25 pages.
B/E Aerospace, Inc.'s Response in case IPR2017-01275 dated Jan. 31, 2018. 52 pages.
B/E Aerospace, Inc.'s Response in case IPR2017-01276 Jan. 31, 2018. 61 pages.
B/E Aerospace, Inc.'s Response in case PGR2017-00019 dated Jan. 31, 2018. 48 pages.
B/E Aerospace's Complaint for Patent Infringement in *B/E Aerospace, Inc.* v. *Zodiac Aerospace, Inc. et al.*, No. 2:14-v-01417 {E.D. Tex., Dec. 15, 2016).
C&D Zodiac, Inc's Notice of Appeal in case IPR2017-01273 dated Mar. 19, 2018. 24 pages.
C&D Zodiac, Inc's Notice of Appeal in case IPR2017-01274 dated Mar. 19, 2018. 28 pages.
C&D Zodiac, Inc's Reply Brief in case No. IPR2017-01275 & IPR2017-01276 dated Oct. 16, 2019. 44 pages.
C&D Zodiac, Inc's Reply in case IPR2017-01275 dated May 1, 2018. 35 pages.
C&D Zodiac, Inc.'s drawings with a leading page entitled "MD90," 27 pages.
C&D Zodiac, Inc.'s Petition for Inter Partes Review of U.S. Pat. No. 8,590,838 (including Exhibits tabs 1-9), May 2, 2014, 856 pages.
C&D Zodiac, Inc.'s proposal to Scandinavian Airlines System to manufacture S4 Storage Unit, Aug. 23, 2001, 17 pages.
C&D Zodiac, Inc.'s Reply in case IPR2017-01276 dated May 1, 2018. 35 pages.
C&D Zodiac, Inc.'s Reply in case PGR2017-00019 dated May 1, 2018. 32 pages.
CA Office Action for Canadian Application No. CA 2879022 dated Aug. 11, 2020, 4 pages.
Canadian Office Action for Application No. CA 2796589 dated Apr. 16, 2020, 3 pages.
Chinese Search Report, dated Aug. 5, 2014, 1 pages, from Chinese application No. 2011800202050.
Decision Denying Institution of Inter Partes Review in case IPR2017-01273 dated Oct. 31, 2017. 11 pages.
Decision Denying Institution of Inter Partes Review in case IPR2017-01274 dated Oct. 31, 2017. 14 pages.
Decision in Institution of Inter Partes Review in case IPR2017-01276 dated Oct. 31, 2017. 28 pages.
Decision in Institution of Post-Grant Review in case PGR2017-00019 dated Oct. 31, 2017. 27 pages.
Decision Instituting Inter Partes Review in case IPR2017-01275 dated Oct. 31, 2017. 24 pages.
Decision pursuant to 37 C.F.R. 42.71(d) in case IPR2017-01273 dated Mar. 8, 2018. 6 pages.
Decision pursuant to 37 C.F.R. 42.71(d) in case IPR2017-01274 dated Mar. 9, 2018. 7 pages.
Declaration of Alan Anderson Under 37 C.F.R. § 1.68.
Declaration of Mitchell Freeman, submitted during prosecution of U.S. Appl. No. 14/709,378.
Declaration of Paul Sobotta executed Apr. 2, 2015 and submitted in IPR2014-00727.
Declaration of R. Klaus Brauer, submitted during prosecution of U.S. Appl. No. 14/709,378.
Declaration of Ronald Kemnitzer executed Apr. 10, 2017 and submitted in PGR2017-00019.
Declaration of Scott Savian, dated Mar. 20, 2017, including Exhibits A-E thereto.
Declaration of Vince Huard, dated Mar. 10, 2017, including Exhibits A-I thereto.
EP Examination Report for European Application No. EP 18202015.6 dated May 29, 2020, 5 pages.
EPO, International Search Report and Written Opinion for PCT international Application No. PCT/US2011/033090 dated Sep. 15, 2011.
Examination Report on Australian Application No. 2017221822 dated Nov. 12, 2018. 2 pages.
Final Written Decision in case IPR2017-01276 dated Sep. 28, 2018. 51 pages.
Final Written Decision in IPR 2017-01276 under 35 U.S.C. 318; 37 U.S.C. 42 dated Sep. 28, 2018. 51 pages.
Final Written Decision in IPR2014-00727 under 35 U.S.C. § 318; 37 C.F.R. § 42.73.
Final Written Decision, Case IPR2014-00727, Paper No. 65 (PTAB Oct. 26, 2015).
Final Written Decision, Case IPR2017-01275, dated Oct. 23, 2018. 49 pages.
First Office Action on Chinese Patent Application No. 201180020205.0 dated Aug. 5, 2014. 17 pages.
First Office Action on Chinese Patent Application No. 201380037324.6 dated Nov. 16, 2015. 15 pages.
Flight Structures, Inc. 747 Door 4 Overhead Crew Rest rendering. 1 page.
Flight Structures, Inc., 747 Door 4 Overhead Crew Rest rendering.
Greg Chamitoff Declaration in support of B/E Aerospace, Inc.'s Motion for Preliminary Injunction, May 14, 2014, 39 pages.
Image of B/E Aerospace "Spacewall," available at <http://beaerospace.com/products/structures-and-integration/737- advanced-lavatory/>.
International Search Report, Jan. 27, 2015, 5 pages, from PCT/US2013/050342 published as WO2014/014780 on Jan. 23, 2014.
Judgment Inter Partes Review in cases IPR2017-01275 and IPR2017-01276 dated Jul. 5, 2018. 4 pages.
Letter from Flight Structures, Inc. to Air France, Aug. 3, 1994, re "B747-400M Door 4 Crew Rest", and enclosures.
Letters from Petitioner, C&D Zodiac, Inc. to Patent Owner, B/E Aerospace, Inc. regarding Prior Art. 64 pages.
McDonnel Douglas, DC-10 Customer Configuration, Oct. 1978, 177 pages.
McDonnell Douglas DC-10 Customer Configuration Summary (a/k/a Orange Book), revised Oct. 1978 (the "Orange Book").
New aircraft lav sees B/E Aerospace flushed with success, Apex Editor's Blog Article dated Apr. 19, 2013.
Notice of Supplemental Authority in *B/E Aerospace, Inc.* v. *C&D Zodiac, Inc.*, Nos. 2019-1935, 2019-1936, dated Feb. 10, 2020, 3 pages.
Office Action on Australian Patent Application No. 2011242901 dated Aug. 25, 2015. 3 pages.
Office Action on Australian Patent Application No. 2016219635 dated Aug. 31, 2016. 3 pages.
Office Action on Canadian Patent Application No. 2796589 dated Jan. 11, 2017. 4 pages.
Office Action on Canadian Patent Application No. 2879022 dated Apr. 16, 2018. 3 pages.
Office Action on Canadian Patent Application No. 2879022 dated Jul. 12, 2017. 3 pages.
Office Action on EP Application No. 18202015.6 dated Jul. 8, 2019. 6 pages.
Office Action on European Patent Application No. 11717127 dated Mar. 16, 2017. 5 pages.
Office Action on European Patent Application No. 13819463 dated Dec. 12, 2017. 4 pages.
Office Action on Japanese Patent Application No. 2013-506240 dated Feb. 24, 2015. 4 pages.
Office Action on Japanese Patent Application No. 2013-506240 dated Jun. 24, 2014. 4 pages.
Office Action on Japanese Patent Application No. 2013-506240 dated Oct. 1, 2013. 4 pages.
Office Action on Japanese Patent Application No. 2015-523145 dated Jun. 5, 2017. 6 pages.
Office Action on Japanese Patent Application No. 2015-523145 dated Mar. 1, 2016. 6 pages.
Office Action on Japanese Patent Application No. 2015-523145 dated Nov. 29, 2017. 4 pages.
Office Action on Japanese Patent Application No. 2015-523145 dated Oct. 18, 2016. 6 pages.
Order on petition for rehearing En Banc in case IPR2014-00727 dated Dec. 7, 2017. 2 pages.

(56) References Cited

OTHER PUBLICATIONS

Patent Owners Opening Brief in Federal Circuit Appeal Nos. 16-1496, 16-1497.
Patent Reexamination Board Decision on CN Application No. 201380037324.6 dated May 30, 2019. 17 pages.
Petition for Inter Partes Review of U.S. Pat. No. 9,073,641 filed Apr. 13, 2017 and assigned IPR No. PR2017-01275.
Petition for Inter Partes Review of U.S. Pat. No. 9,365,292 filed Apr. 13, 2017 and assigned IPR No. PR2017-01274.
Petition for Inter Partes Review of U.S. Pat. No. 9,440,742 filed Apr. 13, 2017 and assigned IPR No. PR2017-01276.
Petition for Post Grant Review of U.S. Pat. No. D. 764,031 filed Apr. 10, 2017 and assigned PGR No. PGR2017-00019.
Petition for rehearing En Banc in case IPR2014-00727 dated Nov. 11, 2017. 46 pages.
Photographs of C&D Zodiac, Inc.'s S4 storage unit, 5 pages.
R. Klaus Brauer, Affidavit Submitted in Related Case U.S. Appl. No. 14/709,378, signed Mar. 31, 2016, pp. 1-19.
R. Klaus Brauer, Affidavit Submitted in Related Case U.S. Appl. No. 14/709,409, signed Mar. 28, 2016, pp. 1-19.
Rendering and photographs of Boeing 747 overhead crew rest station, 3 pages.
Request for Reconsideration of Decision Denying Institution of Inter Partes Review in case IPR2017-01273 dated Nov. 29, 2017. 15 pages.
Request for reconsideration of decision denying institution of inter partes review in case IPR2017-01274 dated Nov. 29, 2017. 15 pages.
Request for rehearing following final written decision in case IPR2017-01276 dated Oct. 12, 2018. 18 pages.
Screen capture from website of Tony Bravetti, available at <http://www.tonybravetti.com/my-work-edited>.
Search on Chinese Patent Application No. 201180020205.0 dated Jul. 28, 2014. 1 page.
Search on Chinese Patent Application No. 201380037324.6 dated Nov. 3, 2015. 2 pages.
Search Report on EP Application No. 18202015.6 dated Jun. 18, 2019. 4 pages.
SEC Exhibit 99.1—B/E Aerospace News Release—"B/E Aerospace Wins Exclusive Boeing Award; Program Estimated Value in Excess of $800 Million."
Second Board Opinion on Chinese Application No. 201380037324.6 dated Jan. 24, 2019. 9 pages.
Second Office Action on Chinese Patent Application No. 201380037324.6 dated Jul. 13, 2016. 16 pages.
Slide Deck, B/E Aerospace, Spacewall Technology, Examiner Interview, Feb. 24, 2016, 53 pages.
Startup Boeing, DC-10 presentation, copyright 2007. 27 pages.
Technical Proposal by FSI to Air France regarding a Door 4 overhead crew rest station for the Boeing 747, Aug. 3, 1994, 10 pages.
Unopposed Motion to Withdraw Motion for Preliminary Injunction in *B/E Aerospace, Inc.* v. *Zodiac Aerospace, et al.*, No. 2:14-cv-210, Oki. 47 (E.D. Tex. Jun. 6, 2014).
Voluntary Dismissal in *B/E Aerospace, Inc.* v. *Zodiac Aerospace, et al.*, No. 2:14-cv-210, 0kt. 50 (E.D. Tex. Jun. 19, 014).
Decision: United States Court of Appeals for the Federal Circuit (2019-1935 and 2019-1936), dated Jun. 26, 2020, 14 pages.

AIRCRAFT INTERIOR LAVATORY

CROSS-REFERENCES TO RELATED APPLICATIONS

This application is a continuation of U.S. application Ser. No. 16/283,471, filed Feb. 22, 2019, which is a continuation of U.S. application Ser. No. 15/258,529, filed Sep. 7, 2016, which is a continuation of U.S. application Ser. No. 15/141,494, filed Apr. 28, 2016, now U.S. Pat. No. 9,463,878, which is a continuation of U.S. application Ser. No. 14/709,378, filed May 11, 2015, now U.S. Pat. No. 9,365,292, which is a continuation of U.S. application Ser. No. 14/043,500, filed on Oct. 1, 2013, now U.S. Pat. No. 9,073,641, which is a continuation of U.S. application Ser. No. 13/089,063, filed on Apr. 18, 2011, now U.S. Pat. No. 8,590,838, which claims the benefit of U.S. Provisional Application No. 61/326,198, filed Apr. 20, 2010, and U.S. Provisional Application No. 61/346,835, filed May 20, 2010, all of which are hereby incorporated by reference herein in their entireties.

BACKGROUND OF THE INVENTION

The present invention relates generally to aircraft enclosures, and more particularly relates to an aircraft cabin enclosure, such as a lavatory, an aircraft closet, or an aircraft galley, for example, including an aircraft cabin structure having an aft portion with a substantially vertically extending exterior aft surface that is substantially not flat in a vertical plane.

Aircraft lavatories, closets and other full height enclosures commonly have forward walls that are flat in a vertical plane. Structures such as passenger seats installed forward of such aircraft lavatories, closets and similar full height enclosures often have shapes that are contoured in the vertical plane. The juxtaposition of these flat walled enclosures and contoured structures renders significant volumes unusable to both the function of the flat walled lavatory or enclosure and the function of the contoured seat or other structure. Additionally, due to the lack of a provision for structural load sharing, conventional aircraft lavatories require a gap between the lavatory enclosures and adjacent structures, resulting in a further inefficiency in the use of space.

Aircraft bulkheads, typically separating passenger cabin areas or classes of passenger service, are in common use, and typically have a contour permitting passengers seated behind the bulkhead to extend their feet modestly under the premium seats immediately forward of the bulkhead. These provide a comfort advantage to passengers seated behind the bulkhead, but provide no increased efficiency in the use of space, in that they do not enable the seats fore and aft of the bulkhead to be placed more closely together. Short, floor-mounted stowage boxes, typically no taller than the bottom cushion of a passenger seat, are often positioned between the flat wall of current lavatories or other enclosures and passenger seats. These provide no improvement to the utility or spatial efficiency of the lavatory or other enclosure. While they do provide some useful stowage for miscellaneous items, they do not provide sufficient additional stowage to provide more space for passenger seating.

It would be desirable to provide an aircraft lavatory or other enclosure that can reduce or eliminate the gaps and volumes of space previously required between lavatory enclosures and adjacent structures to allow an adjacent structure such as passenger seating installed forward of the lavatory or other enclosure to be installed further aft, providing more space forward of the lavatory or enclosure for passenger seating or other features than has been possible in the prior art. Alternatively, the present invention can provide a more spacious lavatory or other enclosure with no need to move adjacent seats or other structures forward.

It would also be desirable to provide an aircraft lavatory or other enclosure with a wall to bear loads from an adjacent passenger seating or other structure, permitting elimination of a required gap between the lavatory or other enclosure and the adjacent passenger seating or other structure, making more space available for other uses. In addition, enabling a lavatory or other enclosure to bear loads from an adjacent structure can reduce the combined weight of the lavatory or other enclosure and the adjacent structure.

It also would be desirable to provide an aircraft lavatory or other enclosure that can reduce or eliminate the gaps and volumes of space previously required between lavatory enclosures and adjacent structures, to allow the installation of an increased number of passenger seats, to increase the value of the aircraft. The present invention meets these and other needs.

SUMMARY OF THE INVENTION

Briefly, and in general terms, the present invention provides for an enclosure, such as a lavatory, an aircraft closet, or an aircraft galley, for example, for a cabin of an aircraft including a structure having an aft portion with a substantially vertically extending exterior aft surface that is substantially not flat in a vertical plane. The enclosure structure permits a combination of the enclosure with the structure in a manner that permits significant saving of space in the aircraft, which in turn permits more seats to be installed, or more space to be offered per seat, increasing the value of the aircraft.

Accordingly, in one presently preferred aspect, the present invention provides for an enclosure unit for a cabin of an aircraft including an aircraft cabin structure having an aft portion with an exterior aft surface that is substantially not flat in a vertical plane. The enclosure unit can be a lavatory, an aircraft closet, or an aircraft galley, for example. In one presently preferred aspect, the enclosure unit includes one or more walls that are taller than an adjacent aircraft cabin structure, the one or more walls defining an interior enclosure space and having a forward wall portion. The forward wall portion is configured to be disposed immediately aft of and adjacent to or abutting the exterior aft surface of the aircraft cabin structure, and the forward wall portion is shaped to substantially conform to the shape of the exterior aft surface of the aircraft cabin structure.

In another presently preferred aspect, the enclosure unit includes an enclosure stall unit, and the aircraft cabin structure is a passenger seat installed immediately forward of the enclosure stall unit. In another presently preferred aspect, the forward wall portion of the enclosure unit is configured to accept loads from the aircraft passenger seat. In another presently preferred aspect, the forward wall portion includes a forward projection configured to project over an aft portion of the adjacent passenger seat immediately forward of the enclosure stall unit.

In another presently preferred aspect, the enclosure is a lavatory, including a lavatory stall unit with one or more walls having a forward wall portion. The one or more walls define an interior lavatory space, and the forward wall portion is configured to be disposed immediately aft of and adjacent to or abutting an aircraft cabin structure having an exterior aft surface having a shape that is substantially not flat in a vertical plane. In a presently preferred aspect, the forward wall portion is shaped to substantially conform to the shape of the exterior aft surface of the aircraft cabin structure.

In another presently preferred aspect, the aircraft cabin structure is a passenger seat installed immediately forward of the lavatory stall unit, and the forward wall portion of the lavatory stall unit is configured to accept loads from the passenger seat. In another presently preferred aspect, the forward wall portion includes a forward projection configured to project over an aft portion of the adjacent passenger seat immediately forward of the lavatory stall unit. In another presently preferred aspect, the forward wall portion defines a secondary space in the interior lavatory space in an area forward of an aft-most portion of the forward wall portion. The secondary space can provide an amenity stowage space inside the lavatory stall unit in the area forward of an aft-most portion of the forward wall portion, and can include design elements providing visual space inside the lavatory in the area forward of an aft-most portion of the forward wall portion.

In another presently preferred aspect, the present invention provides for an assembly of an aircraft enclosure unit and an aircraft cabin structure for an aircraft cabin, the assembly in combination including an aircraft cabin structure having an exterior aft surface having a shape that is substantially not flat in a vertical plane, and an aircraft enclosure unit including at least one wall having a forward wall portion. The one or more walls define an interior enclosure space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft enclosure unit. In another presently preferred aspect, the forward wall portion is configured to accept loads from the aircraft passenger seat. In another presently preferred aspect, the forward wall portion includes a forward projection configured to project over an aft portion of the adjacent passenger seat immediately forward of the aircraft enclosure unit.

In another presently preferred aspect, the aircraft enclosure unit is a lavatory stall, and the one or more walls define an interior lavatory space. In another presently preferred aspect, the forward wall portion defines a secondary space in the interior lavatory space in an area forward of an aft-most portion of the forward wall portion.

In another presently preferred aspect, the present invention provides for an assembly of an aircraft lavatory unit and an aircraft cabin structure for an aircraft cabin, in which the assembly in combination includes an aircraft cabin structure having an exterior aft surface having a shape that is substantially not flat in a vertical plane, and an aircraft lavatory stall unit including one or more walls having a forward wall portion. In another presently preferred aspect, the one or more walls define an interior lavatory space, the forward wall portion is disposed immediately aft of and adjacent to the aircraft cabin structure, and the forward wall portion is shaped to substantially conform to the shape of the exterior aft surface of the aircraft cabin structure. In another presently preferred aspect, the aircraft cabin structure is a passenger seat installed immediately forward of the aircraft lavatory stall unit, and wherein the forward wall portion of the aircraft lavatory stall unit is configured to accept loads from the passenger seat. In another presently preferred aspect, the forward wall portion includes a forward projection configured to project over an aft portion of the adjacent passenger seat immediately forward of the aircraft lavatory stall unit. In another presently preferred aspect, the forward wall portion defines a secondary space in the interior lavatory space in an area forward of an aft-most portion of the forward wall portion.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
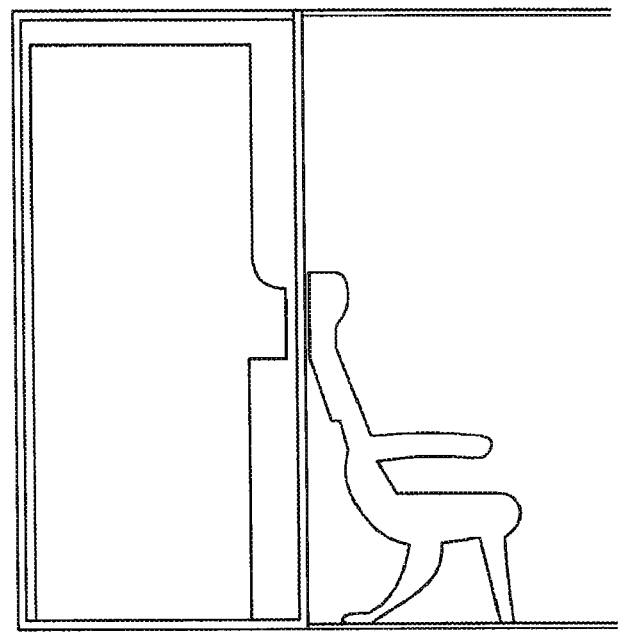
FIG. 1 is a schematic diagram of a prior art installation of a lavatory immediately aft of and adjacent to an aircraft passenger seat.
Figure 2:
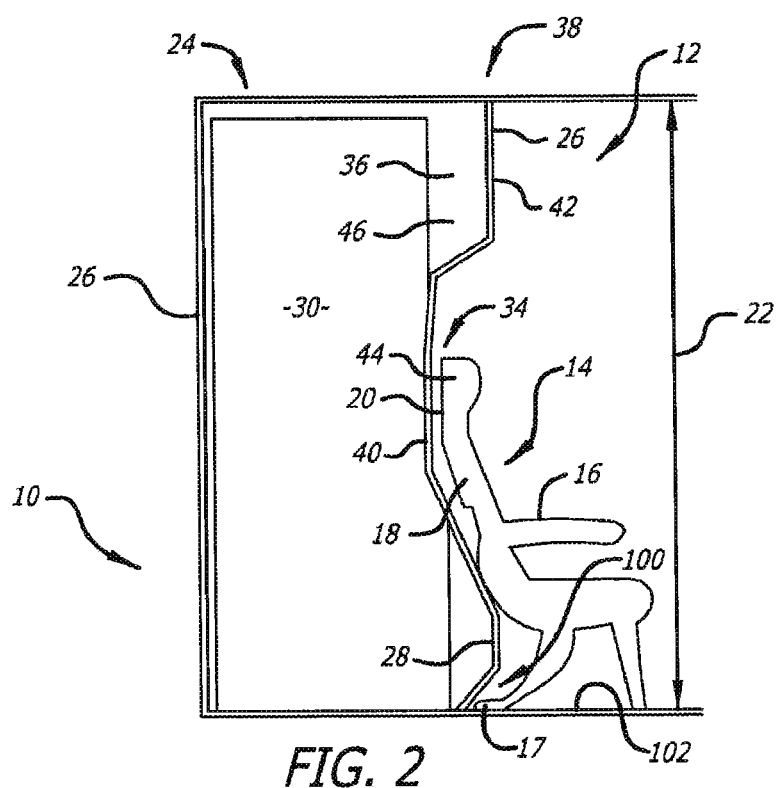
FIG. 2 is a schematic diagram of an installation of a lavatory according to the present invention immediately aft of and adjacent to or abutting an aircraft cabin passenger seat.

Referring to the drawings, which are provided by way of example, and not by way of limitation, the present invention provides for an enclosure 10, such as a lavatory for a cabin 12 of an aircraft (not shown), although the enclosure may also be an aircraft closet, or an aircraft galley, or similar enclosed or structurally defined spaces, for example. As is illustrated in FIG. 2, the cabin includes a structure 14, and the enclosure may be taller than the cabin structure. The cabin structure can be a passenger seat 16, for example, installed immediately forward of the enclosure and having an aft portion 18 with and exterior aft surface 20 that is substantially not flat in a vertical plane 22. The lavatory includes a lavatory stall unit 24 having one or more walls 26 having a forward wall portion 28. The one or more walls define an interior lavatory space 30, and the forward wall portion is configured to be disposed immediately aft of and adjacent to or abutting the exterior aft surface of the aircraft cabin structure. The forward wall portion has a shape that is substantially not flat in the vertical plane, and preferably is shaped to include a recess 34 such that the forward wall portion substantially conforms to the shape of the exterior aft surface of the aircraft cabin structure. In a presently preferred aspect, the forward wall portion of the lavatory stall unit is configured to accept loads from the passenger seat. As shown in FIG. 2, the forward wall portion 28 can be configured to provide a lower recess 100 formed between the forward wall portion 28 and the cabin deck 102. As also shown in FIG. 2, the lower recess 100 can be configured to receive at least a portion of an aft-extending seat support 17 therein. As can be seen by comparing FIG. 1 and FIG. 2, the recess 34 and the lower recess 100 combine to permit the passenger seat 16 to be positioned farther aft in the cabin than would be possible if the lavatory enclosure 10 included a conventional flat and vertical forward wall without recesses like that shown in FIG. 1, or included a forward wall that did not include both recesses 34, 100.

In another presently preferred aspect, the forward wall portion defines a secondary space 36 in the interior lavatory space in an area 38 forward of an aft-most portion 40 of the forward wall portion, and the forward wall portion includes a forward projection 42 configured to project over the aft portion of the adjacent passenger seat back 44 immediately forward of the lavatory stall unit. The secondary space can include an amenity stowage space 46 inside the lavatory stall unit in the area forward of the aft-most portion of the forward wall portion, and the secondary space can include design elements providing visual space, such as a visual perception of space, inside the lavatory in the area forward of an aft-most portion of the forward wall portion.

It will be apparent from the foregoing that while particular forms of the invention have been illustrated and described, various modifications can be made without departing from the spirit and scope of the invention. Accordingly, it is not intended that the invention be limited, except as by the appended claims.

The invention claimed is:

1. A lavatory unit for a cabin of an aircraft, comprising:
an aft wall; and
a forward wall comprising:
   an upper portion;
   a lower portion;
   a middle portion below the upper portion defining an upper recess aftward of at least a portion of the lower portion;
   wherein the upper recess is adapted to receive at least a portion of the exterior aft surface of a seat back of a seat immediately forward of the forward wall;
   wherein the lower portion of the forward wall is adapted to receive at least a portion of a seat support of the seat aftward of at least a portion of the lower portion for mounting the seat support to the aircraft; and
   wherein the forward wall is adapted to receive loads.

2. The lavatory unit of claim 1, wherein the forward wall is adapted to receive loads from the seat.

3. The lavatory unit of claim 1, wherein the forward wall is adapted to receive loads from an adjacent structure exterior of the lavatory unit.

4. The lavatory unit of claim 1, wherein the forward surface of the forward wall is shaped to substantially conform to the shape of the upwardly and aftwardly inclined seat back of the seat.

5. The lavatory unit of claim 4, wherein an aft-facing surface of the lower portion is accessible from the interior.

6. The lavatory unit of claim 4, wherein an aft-facing surface of the middle portion is accessible from the interior.

7. The lavatory unit of claim 4, wherein at least an aft-facing surface of the upper portion, an aft-facing surface of the middle portion, and an aft-facing surface of the lower portion of the forward wall are accessible from an interior of the lavatory unit.

8. The lavatory unit of claim 1, wherein the upper recess is adapted to receive at least a portion of the exterior aft surface of the seat back when the seat back is in an upright and not a reclined position.

9. The lavatory unit of claim 1, wherein the aft-facing surface of the upper portion defines an interior secondary space aftward of the aft-facing surface of the upper portion, and wherein the secondary space is accessible from the exterior of the lavatory unit.

10. A lavatory unit for a cabin of an aircraft, comprising:
an aft wall; and
a forward wall comprising:
   an upper portion;
   a lower portion;
   a middle portion below the upper portion defining an upper recess aftward of at least a portion of the lower portion;
   wherein the upper recess is adapted to receive at least a portion of the exterior aft surface of a seat back of a seat immediately forward of the forward wall;
   wherein the lower portion of the forward wall is adapted to receive at least a portion of a seat support of the seat aftward of at least a portion of the lower portion for mounting the seat support to the aircraft; and
   wherein the forward wall is configured to be positioned adjacent a structure within the cabin without a gap and accept loads from the structure.

11. The lavatory unit of claim 10, wherein the structure comprises the seat.

12. The lavatory unit of claim 10, wherein the structure is exterior of the lavatory unit.

13. A lavatory for a cabin of an aircraft, the cabin having an aircraft passenger seat positioned forward of and adjacent to the lavatory, the lavatory comprising:
an aft wall; and
a forward wall, wherein an interior of the lavatory is disposed between the aft wall and the forward wall, the forward wall comprising:
   an upper portion;
   a middle portion defining an aft-extending upper recess below the upper portion, the middle portion including a flat portion;
   a lower portion below the middle portion;
   wherein the lower portion comprises a downward extending vertical portion, and wherein a seat support of the aircraft passenger seat is secured aft of the downward extending vertical portion, the seat support configured to interface with a floor of the cabin and hold a seat bottom of the aircraft passenger seat in an elevated position.

14. The lavatory of claim 13, wherein the flat portion of the middle portion defines an aft-most portion of the upper recess and the portion of the exterior aft surface of the seat back is an upper seat back such that the aft-most portion of the upper recess is parallel to an aft surface of the upper seat back when the seat back is in the unreclined position.

15. The lavatory of claim 13, wherein the forward wall is configured to accept loads from a structure adjacent the lavatory.

16. The lavatory of claim 15, wherein the lavatory is configured to be positioned adjacent a portion of the structure with no gap.

17. The lavatory of claim 15, wherein the structure comprises the aircraft passenger seat.

* * * * *